United States Patent

[11] 3,590,632

| [72] | Inventor | Walter Gegenschatz<br>Uster, Switzerland |
|---|---|---|
| [21] | Appl. No | 775,336 |
| [22] | Filed | Nov. 13, 1968 |
| [45] | Patented | July 6, 1971 |
| [73] | Assignee | Zellweger, Ltd.<br>Uster, Switzerland |
| [32] | Priority | Nov. 23, 1967 |
| [33] | | Switzerland |
| [31] | | 16,488 |

[54] PROCESS FOR MEASURING THE STRENGTH AND ELONGATION OF A CONTINUOUSLY TRAVELLING THREAD
1 Claim, 1 Drawing Fig.

[52] U.S. Cl. .................................................... 73/95.5, 73/144
[51] Int. Cl. .......................................................... G01n 3/08
[50] Field of Search .......................................... 73/95.5, 144; 324/125; 242/75.43, 75.44

[56] References Cited
UNITED STATES PATENTS

| 3,512,406 | 5/1970 | Roberts | 73/144 |
| 1,851,895 | 3/1932 | Cornet | 73/95.5 |
| 3,093,794 | 6/1963 | Brooks et al. | 423/125 X |
| 3,474,666 | 10/1969 | Litzler | 73/95.5 |

*Primary Examiner*—Jerry W. Myracle
*Attorneys*—Kenyon & Kenyon and Reilly, Carr & Chapin

ABSTRACT: An electronic damping element is interposed between the force-measuring instrument and indicating instrument to produce a mean value from the signal emitted from the measuring instrument for recording as a smooth deviating line by the indicating instrument. The damping element can be switched on or off. The mean value can be preset by regulating the speed ratio between the roller assemblies.

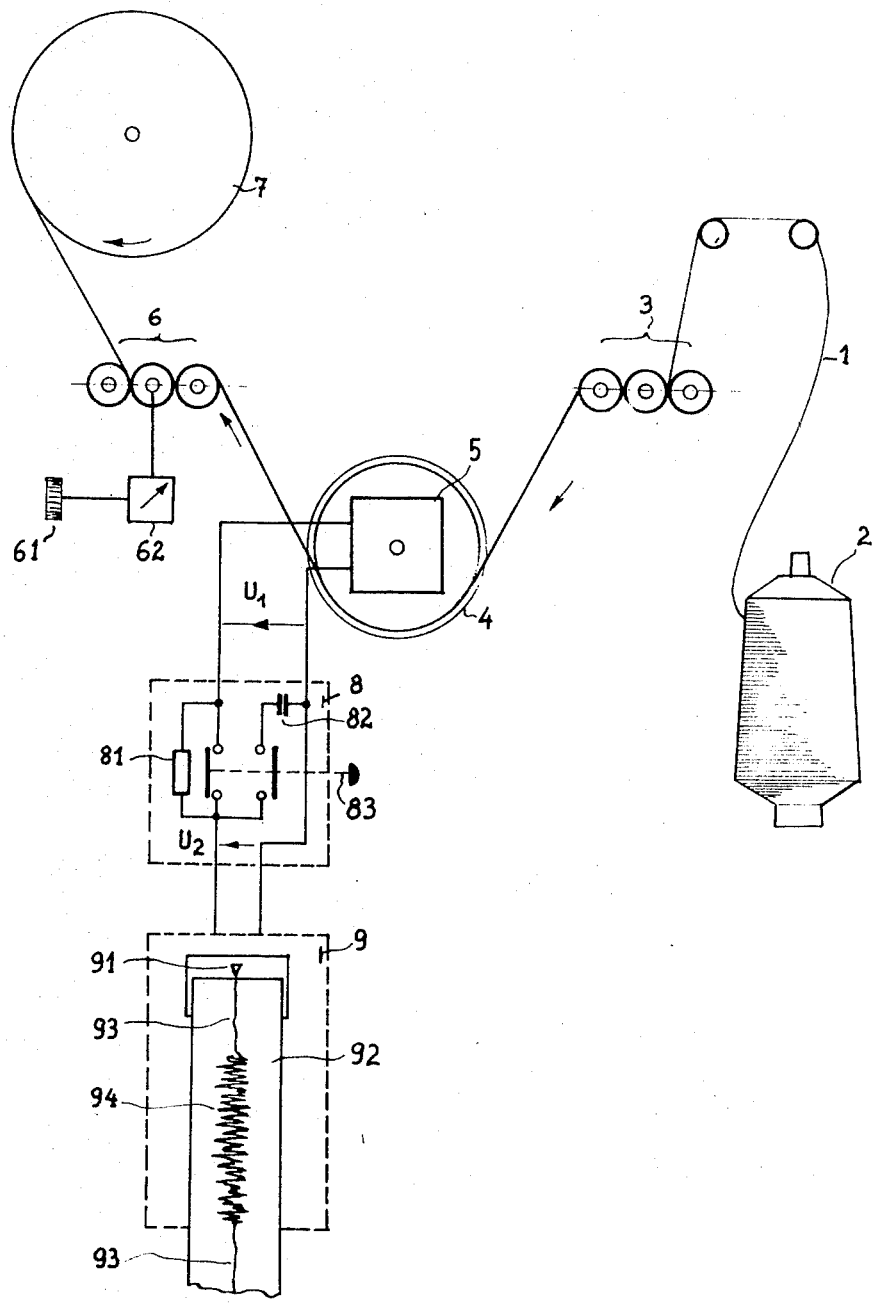

PROCESS FOR MEASURING THE STRENGTH AND ELONGATION OF A CONTINUOUSLY TRAVELLING THREAD

This invention relates to a process and apparatus for measuring the strength and elongation of a continuously travelling thread. More particularly, this invention relates to a process and apparatus for dynamically measuring the strength and elongation of a thread.

Heretofore, in addition to static tests of the strength of threads in which dynamometers have particularly been used, tests of running threads have also been used to obtain further data from which to draw conclusions as to the quality of threads. In such tests, the running threads have been subjected to a predetermined load and/or elongation while running through a measuring section. The chief reason for these tests is that it has been possible to test very great lengths of thread within a tolerable length of time whereas, in the instance of dynamometers, only a limited length of thread can be subjected to testing.

The heretofore testing of running thread has relied on the principle of subjecting the thread to a predetermined load so as to effect a certain elongation. Alternatively, the thread has also been subjected to a constant elongation so as to effect a variable force in the thread which has been determined by known measuring organs. This latter method of measurement has been particularly suitable for testing continuously running threads since the constant elongation can be produced in a simple manner by conducting the thread over drive rollers that rotate with peripheral speeds that are different from one another. The force produced in the thread has, however, not been constant but rather has fluctuated about a mean value depending on the elongation of the piece of thread running at the moment through the measuring section of the measuring organs. Since the thread has been pulled through the measuring section at high speed, the resulting fluctuations in the value of the force are also of high frequency. Therefore, exact determinations of the force can be effected only by the aid of recording instruments or of oscillographs.

Further, this kind of dynamic testing presents a problem in obtaining a given mean force in accordance with the elongation. That is, for the continuous testing of thread, it has been difficult to make a specified mean force act on the thread.

Accordingly, it is an object of the invention to make a predetermined mean force act on a running thread in a dynamic thread test.

It is another object of the invention to visually indicate the mean value of the force in an elongated section of a travelling thread passing through a measuring apparatus.

Briefly, the invention is directed to a process for determining the strength and/or elongation of a continuously running thread wherein the thread is subjected to a predetermined elongation and acts on a force-measuring instrument that emits an electrical signal in correspondence to the applied force. The process includes the further step of conducting the electrical signal to a damping element in which a mean value of the received signal is formed and thereafter made visual on an indicating instrument.

This invention also includes an apparatus for producing the mean value of the signal and for indicating this mean value. The apparatus includes a damping element which receives the emitted fluctuating signal from the force-measuring instrument of a thread-measuring apparatus and which forms a mean value from the fluctuating signal. In addition, the apparatus also includes an indicating instrument which is connected to the damping element for indicating the formed mean value visually.

These and other objects and advantages of the invention will become more apparent when taken with the following detailed description and the accompanying drawing in which the FIGURE schematically illustrates an apparatus of the invention connected to a thread measuring apparatus.

Referring to the drawing, the thread 1 that is to be tested is taken from a spool 2 and conveyed over a first roller assembly 3 which imparts a predetermined constant speed to the thread 1. The thread 1 is then looped over a rotatable measuring drum 4 of a force measuring instrument 5 of known construction and directed into a second roller assembly 6. The second roller assembly 6 is adjustably regulated via a speed-regulating organ, such as a knob 61 and suitable transmission 62 to run at a speed greater than the rotary speed of the first roller assembly 3. To this end, the roller diameters of the two roller assemblies 3, 6 are equal so that the peripheral speeds behave similarly to the rotary speeds. The transmission 62 is constructed so as to translate the adjustments of the knob 61 into greater speeds of the second roller assembly 6 over the first roller assembly 3. For example, the transmission 62 thus can contain a differential gear to which a fixed rotational speed and a variable rotational speed, controlled by the knob 61, are applied so that the output of the differential gear results in the adjustable speed of the rollers of the roller assembly 6. In operation, in the case where the rollers of the roller assembly 3 rotate at 1,000 r.p.m., and the rollers of the roller assembly 6 are able to rotate between 1,000 and 1,250 r.p.m., a zero setting of the knob 61 cause the rollers of the roller assembly to rotate at 1,000 r.p.m. Also, turning of the knob 61 in equal increments causes the rollers of the roller assembly 6 to increase gradually through the intermediate speeds to the maximum speed of 1,250 r.p.m. The thread 1 is then directed into a winding device 7 upon leaving the second roller assembly 6.

The axle of the measuring drum 4 is mounted so as to be subjected to a radial stress by the thread 1 running therearound and so as to transfer the stress into the force-measuring instrument 5 for converting into an electrical signal $U_1$. Such force-measurement conversions can be carried out, for example, by capacitive, inductive, piezoelectric or other known methods.

The signal $U_1$ is emitted from the force-measuring instrument 5 via a damping element 8 that can be switched in or out to an indicating instrument 9. The damping element 8 contains a switch 83 for switching the damping element 8 into or out of the circuit for the signal $U_1$. In the position of the switch 83 shown, the input and output of the damping element 8 are switched through so that the indicating element 9 receives the unchanged signal $U_1$. The signal $U_1$ is then indicated through the intermediary of a recording instrument 91 as a line trace 94 on a record strip 92. The irregular line trace 94 thus represents the unaltered signal $U_1$ and thus the force acting on the measuring drum 4 at each instant of time, i.e. continuously.

With the switch 83 in the position (not shown) activating the damping element 8, a resistance 81 is switched into one conductor of the damping element 8 in series and a capacitor 82 is switched into the two conductors of the damping element 8 in parallel. A voltage $U_2$ is then formed at the capacitor 82 to represent the mean value of the signal $U_1$ over an interval of time established by the time constant of the resistance 81/capacitor 82 combination. As a result, the trace on the record strip 92 now appears as a smoothed-out and gradually laterally deviating line 93. This line 93 visually indicates the mean value of the signal $U_1$ and, thus, the mean value of the force acting on the measuring drum 4.

In order to carry out a dynamic test in which a predetermined mean force is brought to act on the thread, the damping element 8 is switched into the circuit between the measuring instrument 5 and indicating instrument 9. The knob 61 is then set so that the mean value of the force assumes the predetermined value. Since the fluctuations of the mean value of the force are insignificant at this point, the setting of the knob 61 is easy and remains constant over a long time period.

In operation, the thread 1 is elongated between the two points represented by the roller assemblies 3, 6 and the force developed in the elongated thread portion is measured by the measuring instrument 5. Next, the measuring instrument 5 produces a proportional signal $U_1$ in response to the measured force and emits the same to the damping element 8. The proportional signal is then damped so as to form a mean value when the damping element 8 is switched on and thereafter is delivered as such to the indicating instrument 9. The indicating instrument 9 then records a trace line in known manner on the record strip 92 in response to the mean value so as to indicate the strength of the thread visually for viewing purposes.

It is noted that the knob 61 is provided with a scale calibrated in elongation values on which the ratio of the peripheral speeds of the roller assemblies 3, 6 can be read and, thus, the magnitude of the elongation. Thus, the thread elongation which occurs for a given mean force can be read directly. That is, if the elongation of a thread under test is unknown, the knob 61 is adjusted to a position where the smoothed mean force on the indicating instrument 9 shows a required value. Consequently, due to the calibration of the knob 61 in elongation values, the elongation related to this mean force is directly readable. This is contrary to the measurement of an unknown mean force at given values for elongation.

What I claim is:

1. A process for determining the strength and elongation of a thread running continuously between an input drive means and an output drive means comprising the steps of elongating the thread between the drive means to generate a tension therein, transforming the generated tension into an electrical signal, recording the value of said signal on a paper chart, selectively damping said signal to produce a mean value of thread tension signal, adjusting the elongation of the thread to a predetermined mean value of thread tension, and reading tee degree of elongation responsive to the mean value of thread tension to determine the ratio of speed between the input drive means and the output drive means.